United States Patent [19]

Moses et al.

[11] 4,272,371
[45] Jun. 9, 1981

[54] LUBRICATING OIL FILTER-REFINER FOR INTERNAL COMBUSTION ENGINES

[75] Inventors: John R. Moses, Annapolis; Adolph Fram, Baltimore, both of Md.

[73] Assignee: Fram-Israelson Enterprises, Baltimore, Md.

[21] Appl. No.: 123,119

[22] Filed: Feb. 21, 1980

[51] Int. Cl.³ .............................................. B01D 35/18
[52] U.S. Cl. .................................. 210/168; 210/180; 210/436; 210/416.5; 196/46.1; 196/115
[58] Field of Search ............... 210/168, 180, 184, 185, 210/416 L, 436; 196/46, 46.1, 115, 128; 123/196 A, 196 CP, 196 AB

[56] References Cited

U.S. PATENT DOCUMENTS

| 824,104 | 11/1902 | Edson | 196/128 |
|---|---|---|---|
| 1,725,845 | 8/1929 | Briel | 196/46.1 |
| 1,816,573 | 7/1931 | Ellis et al. | 210/168 |
| 2,070,453 | 2/1937 | Rudman | 196/128 |
| 2,540,134 | 2/1951 | Nelson | 210/168 |
| 2,785,109 | 3/1957 | Schwalge | 210/180 |
| 2,839,196 | 6/1958 | Schwalge | 210/184 |
| 2,930,749 | 3/1960 | Davis | 196/46 |
| 3,915,860 | 10/1975 | Priest | 210/436 |
| 3,956,071 | 5/1976 | O'Brien | 196/46 |
| 4,189,351 | 2/1980 | Engel | 210/180 |

Primary Examiner—Ernest G. Therkorn
Attorney, Agent, or Firm—Quaintance, Murphy & Richardson

[57] ABSTRACT

A lubricating oil filter-refiner for internal combustion engines includes an evaporation chamber with an array of relatively thin, corrugated plates for forming a plurality of running oil films from which volatile contaminants evaporate. In order to enhance its efficiency, the evaporation chamber is connected to a vacuum source such as the air intake of an engine.

1 Claim, 11 Drawing Figures

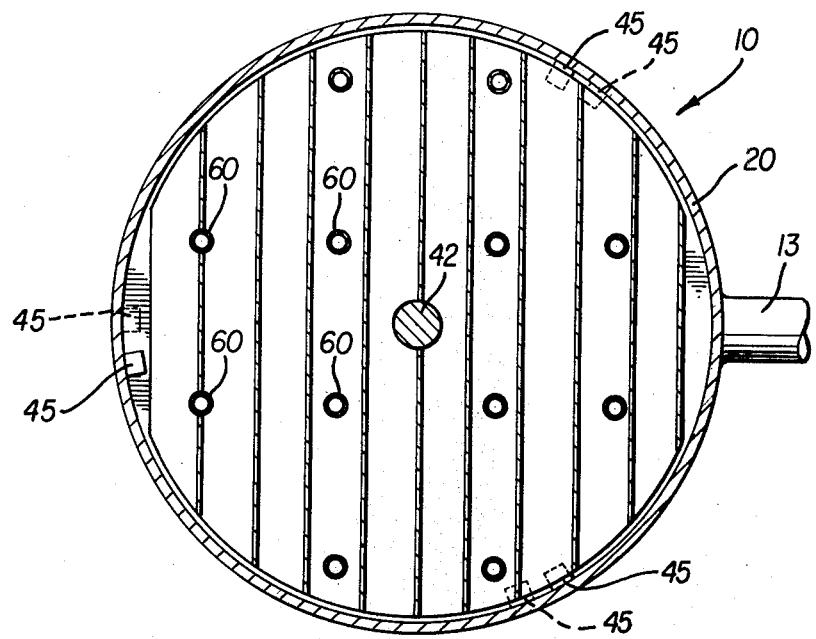
FIG. 3
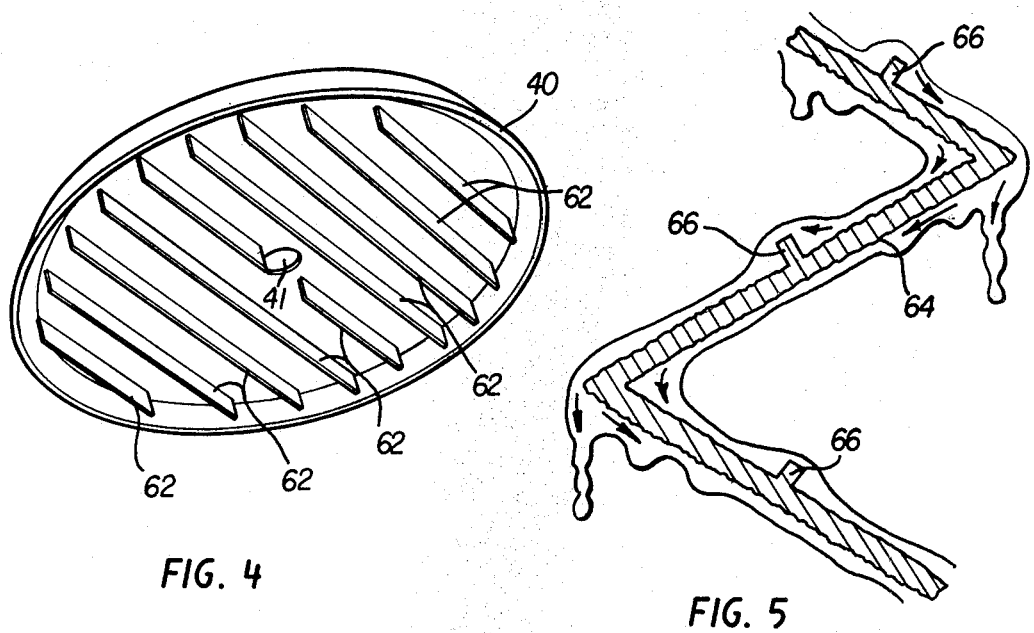
FIG. 4
FIG. 5

LUBRICATING OIL FILTER-REFINER FOR INTERNAL COMBUSTION ENGINES

BACKGROUND OF THE INVENTION

An enormous quantity of lubricating oil is consumed annually due to the necessity of changing oil at least once a year for ordinary passenger vehicles and even more frequently for fleet vehicles and vehicles subject to heavy use. This is particularly the case with vehicles and other devices using diesel engines. Manufacturers of diesel engines specify oil changes every three to four thousand miles. It is estimated that approximately four billion quarts of oil are consumed annually in the United States alone due to oil changes. In addition, the quality of oil in an engine rapidly decreases due to particulate matter, water, gasoline and acid which rapidly builds up in the lubricant and is circulated in the engine for long periods of time before recommended oil changes are made. Consequently, internal combustion engines tend to wear out long before they would wear out if only run with high quality oil.

These problems have long been recognized in the art and the patent literature includes numerous patents covering various filter-refiners. For one reason or another, none of these filter-refiners have achieved wide commercial acceptance even though one of the inventors, Adolph Fram, in the instant patent application enjoyed years of success utilizing oil filter-refiners with his taxicab fleet.

One of the difficulties frustrating acceptance of oil filter-refiners has been expense. This is primarily due to the mistaken assumption that the refiners need a heater. Heaters necessitate expensive cast components which add considerable cost to the units. As has been pointed out in the prior art, it is desirable to produce oil films in an evaporation chamber in order to facilitate removal of volatile contaminates such as gasoline, water and acid, however, the prior art has failed to provide sufficient structure to create a large oil film area.

Although the prior art does suggest in at least one patent that the air vent of a filter-refiner can be connected to the intake of the internal combustion engine with which the filter is used, there is no realization that by making this connection in an appropriate manner, the efficiency of an evaporation chamber can be increased dramatically without resorting to the application of supplemental heat. The oil is hot enough in and of itself for the refinement process and is frequently more effective for lubrication purposes when cooled. By utilizing the evaporation chamber approach, evaporation of gasoline, acid and water from the oil tends to cool the oil so that the oil returned to the engine is both purified and cool.

SUMMARY OF THE INVENTION

In view of the aforementioned considerations, it is a feature of the instant invention to provide a new and improved oil filter-refiner wherein contaminates are removed from an oil film in an evaporation chamber in which the surface area of the oil film is enlarged and wherein the effectiveness of the evaporation chamber is increased by connecting the chamber to the air intake, or another vacuum source, provided by the internal combustion engine with which the filter is used.

In view of this feature, the instant invention contemplates an oil filter-refiner having a cotton wad or other high quality filter disposed between the inlet and outlet of the filter-refiner, a splash baffle disposed in space relation with the filter, means for directing streams of oil exiting from the filter onto the splash baffle and plurality of plates beneath the baffle for distributing oil pouring therefrom into a multiplicity of film like streams so as to facilitate evaporation of volatile contaminates from the lubricant.

The instant invention further contemplates connecting the evaporation chamber to the inlet of the internal combustion engine or other vacuum source such as the exhaust system in order to maintain a partial vacuum in the evaporation chamber and so as to oxidize evaporated contaminates without fouling the atmosphere.

BRIEF DESCRIPTION OF THE DRAWINGS

FIG. 3 is a cross-section taken along lines 3—3 of FIG. 2;

FIG. 4 is a bottom perspective view of a splash baffle plate used with the embodiment of FIG. 2;

FIG. 5 is an enlarged cross-section of an evaporator plate used with the embodiment of FIG. 2 showing roughened surfaces on the plate which facilitate formation of contaminate bubbles and turbulent flow;

DESCRIPTION OF THE PREFERRED EMBODIMENTS

Figure 2:
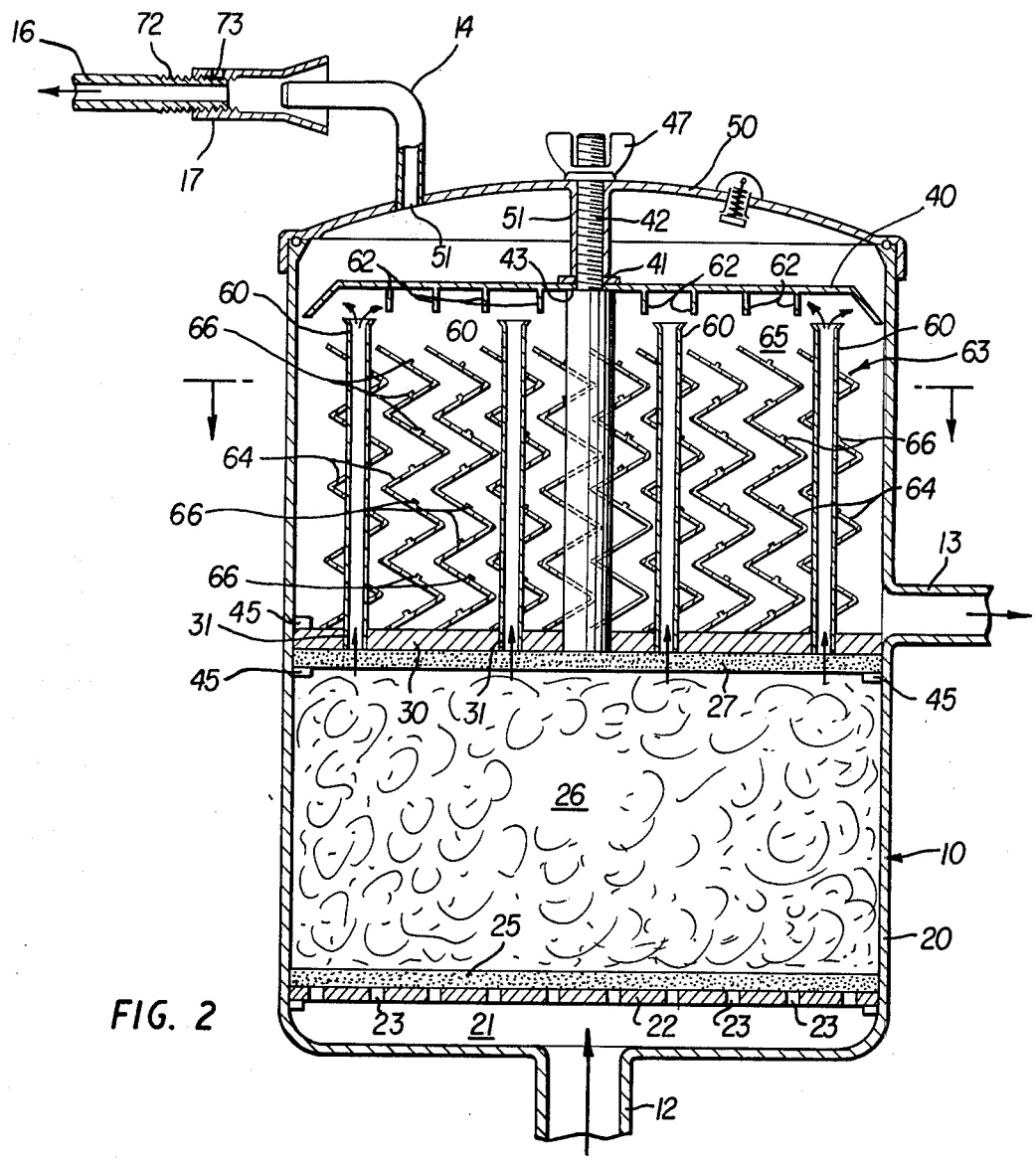
FIG. 2 is a side elevation of a first embodiment of the oil filter-refiner according to the instant invention.
Figure 1:
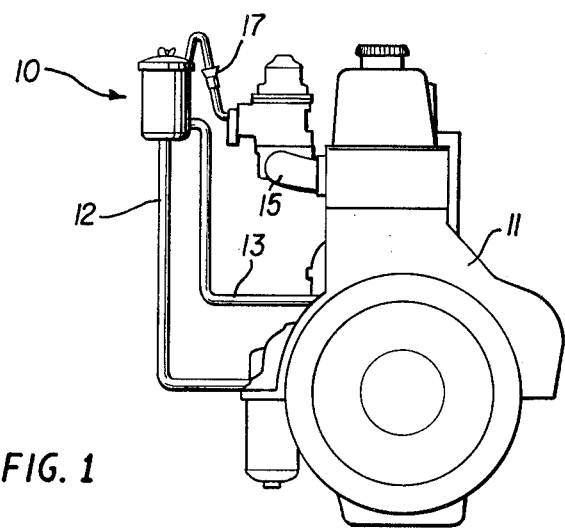
FIG. 1 is a schematic view showing an oil filter-refiner in accordance with the instant invention for filtering and refining oil from an internal combustion engine and including a connection between an evacuation chamber in the filter-refiner to the air intake of the engine.

Referring now to FIG. 1, there is shown a filter-refiner, designated generally by the numeral 10, connected to an internal combustion engine 11 by a lubricant inlet line 12 for pumping lubricant into the filter-refiner and an outlet line 13 for returning filtered and refined lubricant to the engine. In addition, the filter-refiner 10 has a vent pipe 14 which is connected to the air intake 15 of the engine by a line 16, which has a vacuum control venturi 17 deposed therein. The point of connection to the engine may be either before or after the carburetor in a carbureted engine or merely at some convenient point in the air intake of a final injected engine.

Referring now to the first embodiment shown in FIGS. 2-5 the filter-refiner 10 comprises a casing 20 having the oil inlet 12 connected to the bottom thereof and the oil outlet 13 connected intermediate its top and bottom. Positioned just above the inlet 12 is a reservoir 21 in which inlet oil under pressure is distributed over a bottom plate 22 having holes 23 therethrough. Over the plate 22 is a felt pad 25 which has generally horizontally disposed fibers and abutting the pad 25 is a cotton filter element 25 composed of a wad of randomly configured cotton strands. The filter 26 has an enormous surface area which traps particulate solids. Disposed above the cotton filter 26 is another felt pad 27. Above the felt pad 27 is a retaining plate 30 having holes 31 therethrough. The oil entering inlet 12 under pressure from the oil pump of the engine flows through the holes 23 in plate 22; through the felt pad 25 and is strained through the cotton filter 26 before passing through felt pad 27 and holes 31 in retaining plate 30. The lubricant emerging from holes 31 is almost entirely free of particulate matter and contains no cotton fibers because felt pad 27 prevents transport of those fibers by the oil.

Although the oil passing through holes 31 is free from particulate matter, it still has entrained liquid and vapor contaminates such as gasoline, acid and water which must be removed by refining. In accordance with the instant invention, these volatile contaminates are evaporated by spreading the oil into thin, running films before pooling the oil above the retainer plate 30 and returning the oil to the engine 11 via outlet line 13.

This refining process is accomplished by providing a splash baffle 40 in spaced relation with the plate 30 to form an evaporation chamber between the splash baffle and retaining plate 30. In order to position the splash baffle 40 properly and to permit rapid assembly and disassembly of the lubricant filter refiner 10, the retainer plate 30 has a central hole 41 therein through which passes a bolt 42. The bolt 42 has a shoulder 43 thereon, upon which the splash baffle 40 rests. A plurality of lugs 45 around the inner periphery of the casing 20 hold the retaining plate 30 in place over the felt pad 25 and cotton wad 27, and a wing nut 47 on the bolt 42 secures a lid 50 to the upper perimeter of the casing 20 while holding a flanged sleeve 51 in abutment with the splash baffle 40.

Aligned with each hole 31 is a tube 60 which carries the oil up to a point just beneath the splash baffle 40. When the oil hits the splash baffle 40, it spreads slightly thereon and runs down ribs 62 on to a stream spreader, designated generally by the numeral 63.

The stream spreader 63 is composed of a plurality of corrugated metal plate 64 made preferably, but not necessarily, from one hundred mil aluminum sheet. As can be seen in the drawings, the plates 64 have gaps 65 therebetween, and are corrugated in overlapping folds or undulations. Preferably, the undulations overlie one another so that oil which may drip from one plate 64 will fall onto another. In addition, the plates 64 each have horizontal dams 66 extending there across for causing the oil to spread into relatively thin films. Moreover the plates 64 have roughened surfaces to encourage formation of bubbles of gasoline vapor, water vapor and acid vapor. In addition, the roughened surfaces tend to cause turbulence which encourages the pockets of vapor to migrate to the surface of the film from which the vapor evaporates. It should be kept in mind that the oil flowing over the plates 64 is hot due to engine heat so that no auxiliary heater is necessary.

Within the lid 50, there is an opening 51 which is positioned above the splash plate 40. The vent 51 is connected via line 16 to the air intake 15 of the engine 11. This creates a partial vacuum in the air space above the retaining plate 30 which increases the efficiency of the refining process by surrounding the running oil film on plates 64 with a low pressure environment in which contaminants more rapidly and readily vaporize from the films. The contaminants are carried into the combustion chamber of the engine 11 by the line 16 where the contaminants are oxidized. The adjustable venturi 17 is provided in order to control the pressure so that oil is not sucked out of the filter-refiner 11 and into the engine, but rather pools on top of the retainer plate 30 so as to flow out of outlet 13. The adjustable venturi 17 includes a flared tube 70 which is slid away from the vent pipe 14 to lower pressure and toward vent 51 to raise pressure. Preferably, the adjustable tube is mounted on threads 72 which connect the tube 16 to the vent pipe 14. The flare tube 70 is held in the desired position by a set screw 73. In order to keep the vacuum in the evaporation chamber below a threshold level, a relief valve 74 is placed in the lid 50 which lets in ambient air at a predetermined level of vacuum.

Figure 6:
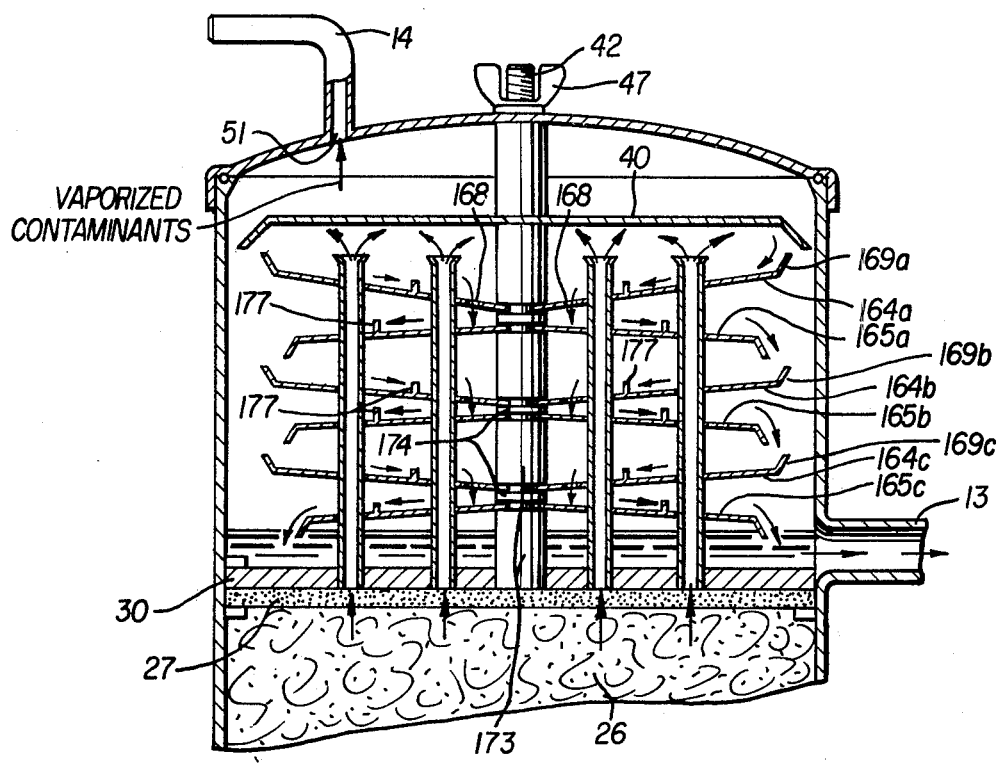
FIG. 6 is a side elevation of a second embodiment of air oil filter-refiner according to the instant invention.
Figure 7:
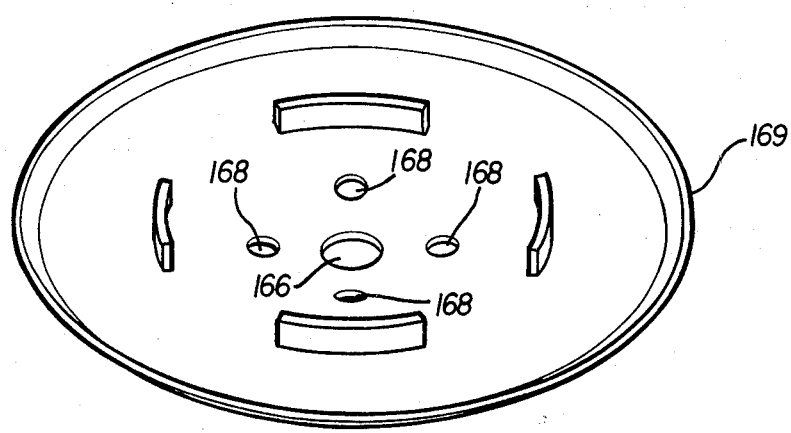
FIG. 7 is a perspective view of a concave spreader plate used in the embodiment of FIG. 6.
Figure 8:
FIG. 8 is a perspective view of a convex spreader plate used in the embodiment of FIG. 6.

Referring now to FIGS. 6, 7 and 8 where the second embodiment of the invention is shown, the stream spreader 63 is replaced by a stream spreader 163 which comprises a plurality of concave plates 164 alternated with a plurality of convex plates 165. The concave plates 164 each have a center hole 166 therethrough which receives the bolt 42 and a plurality of drain holes 168 radially spaced about the center hole through which oil running down the plate drains onto the convex plate 165 mounted below the concave plate. The concave plates 164 also include a rim 169 which keeps oil which has drained onto the plate from spilling over the edge. The convex plates 165 include center holes 171 for receiving the bolt 42. Long brushings 173, positioned around the bolt 42, are alternated with short brushings 174 to hold to the concave and convex plates 164 and 165 in spaced relation with respect to one another.

In operation, lubricating oil is sprayed against splash baffel 40 and drops onto concave plate 164, where it spreads out and drains through holes 168 onto convex plate 165a. The oil then spreads over the convex plate 165a and forms a film which drains into a lower concave plate 164b. A film is again formed on plate 164b before the oil drains onto a lower convex plate 164b. While three concave plates 164a-c are shown alternated with three convex plates 165a-c, it is to be understood that any number of alternating plates can be utilized to provide the necessary oil film area. After the oil drains from the last plate, it pools above the retaining plate 30 before leaving through outlet 13. As with the embodiment of FIG. 2, volatile contaminants evaporate from the warm oil while the oil is spread into a running film. In order to encourage the oil to spread into a film dams 177 may be provided on the concave and convex plates 164 and 165. In addition, the plates 164 and 165 may be roughened in the manner shown in FIG. 5.

Figure 9:
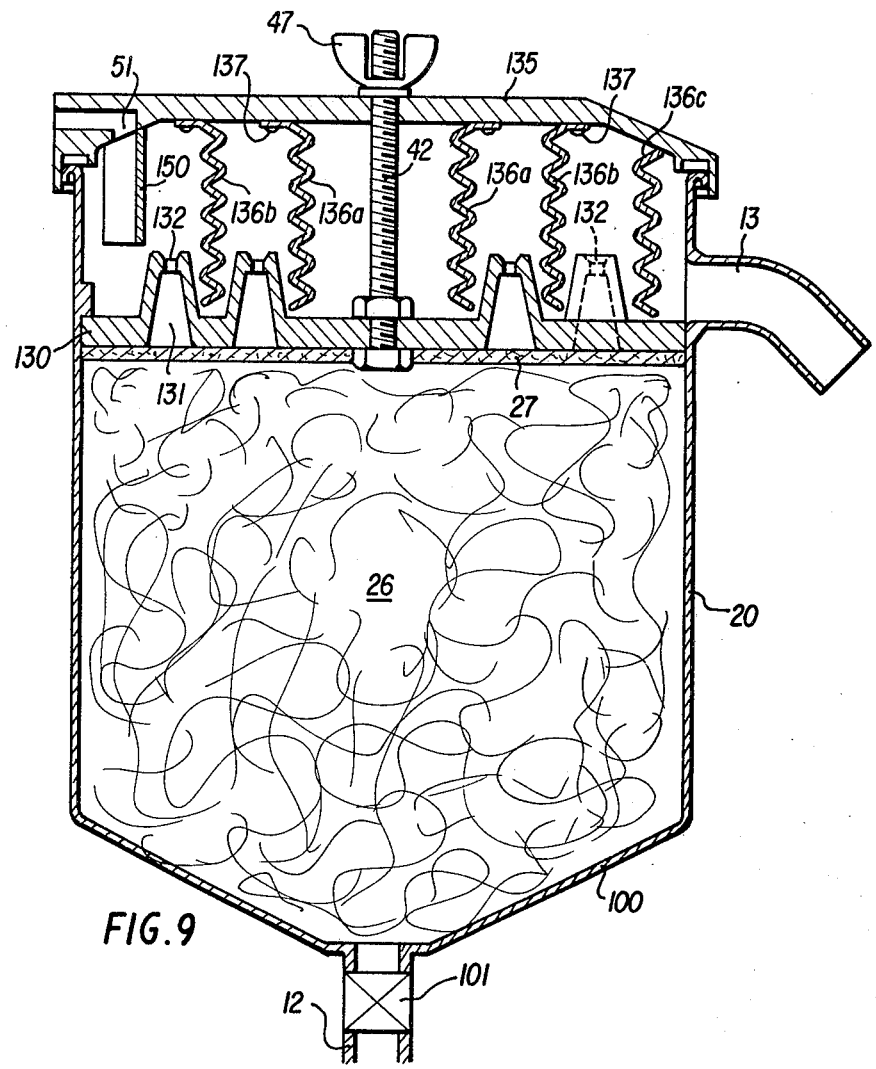
FIG. 9 is a side elevation of a third embodiment of the invention.
Figure 10:
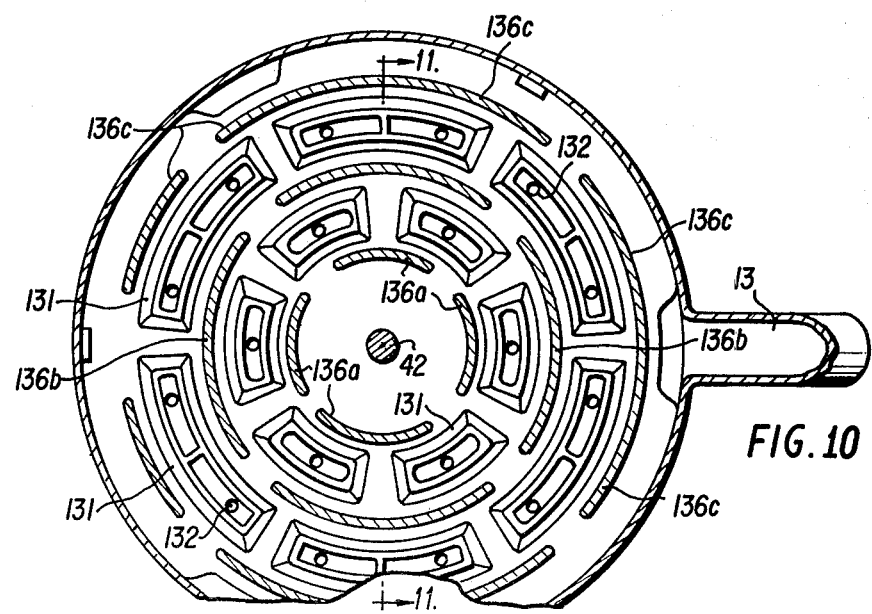
FIG. 10 is a cross-section taken along Lines 10—10 of FIG. 9.
Figure 11:
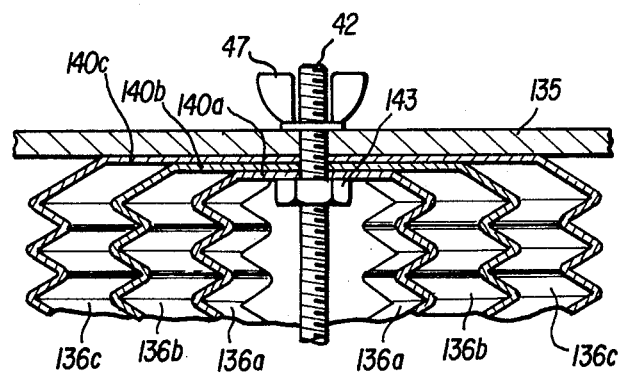
FIG. 11 is a cross-section of a spreader plate unit showing a pair of spreader plates connected by a strap.

Referring now to FIGS. 9, 10 and 11, there is shown a third embodiment of the instant invention wherein the case 20 has a conical end section 100 with the inlet 12 connected thereto. Preferably, a one-way valve, schematically shown at 101, is provided so that there will be no tendency for cotton strands in cotton wad 26 from getting into the inlet line 12. In the embodiment of FIG. 9, a retaining plate 130 is provided which has nozzles 131 therein which project upwardly therefrom. The nozzles 131 have flared outlet holes 132 through which oil or lubricant is sprayed after passing through the felt pad 27 positioned over the cotton wad 26. The oil hits the bottom surface of cap 135 and runs down spreader plates 136a-136c which in accordance with one approach are secured to the cap 135 by screws 137, or the like. As is seen in FIG. 9, the spreader plates 136a–136c are corrugated in order to increase their length so that areas of films formed thereon are greater than would be the case if the spreader plates 136 were flat. If desired, the spreader plates 136a–136c could have dams thereon (not shown) such as the dams 66 shown in FIGS. 2 and 5. Moreover, the spreader plates 136a–136c could have roughened surfaces such as the roughened surfaces of the spreader plate 64 shown in FIG. 5.

An arrangement according to the instant invention for retaining the spreader plates 136a–136c in place is shown in FIG. 11 in which each spreader plate is part of a configuration stamped from a sheet of metal. As is shown in FIG. 11 opposed spreader plates 136 are connected by integral straps 140a–140c each having a hole 141 therethrough to receive the bolt 42. A nut 143 screwed on bolt 42 is then used to secure the strap 140 against the bottom surface of cap 135. Since there are a plurality of opposed spreader plate arrays 136a–136c connected by separate straps 140a–140c, the straps may simply be placed in abutment with one another and the single nut 143 used to hold all of the straps in place.

In the embodiment of FIGS. 9–11, the vent 51 is shielded by a baffle 150 which simply keeps oil sprayed by the adjacent nozzle 131 from spraying out through the vent. As with the embodiment of FIG. 2, the vent 51 in FIG. 9 can be connected to a vent pipe 14 and thereafter to the air intake of an associated internal combustion engine 11 (FIG. 1).

In each of the aforesaid embodiments, the oil passes into a filtering chamber and through a chamber medium wherein all foreign and solid particles, including dirt and metal, are separated from the oil and are held within the filtering medium.

The filtered oil then passes into the refining chamber or evaporation chamber where separate baffles retain desirable heat factors which separate, distill and evaporate water, acids and harmful liquids. The de-emulsified oil is pure or purer than new oil.

By using the arrangement in accordance with the instant invention, oil in the internal combustion engine 11 need never be changed. The only procedures necessary are to periodically replace the wad of cotton which forms the filter 26 and to replace the oil which is taken out because the filter cotton is saturated with contaminants. The filter-refiner 10 can be mounted near the top of the engine so as to be accessible from above. It is no longer necessary to lift vehicles over waste oil containers or to crawl beneath vehicles in order to drain oil from the engine sump. Maintenance procedures are therefore performed more quickly and with less aggravation and expense. In addition, literally billions of quarts of oil are saved annually because it is not necessary to drain oil from engines. Moreover it has been found that engines using filter-refiners remain clean so that engine life is increased dramatically.

What is claimed is:

1. A lubricant filter refiner in combination with an internal combustion engine, the combination comprising:

a casing having upper and lower ends, said casing having an inlet at the lower end thereof for used oil from the engine and an outlet intermediate the upper and lower ends thereof for returning refined oil to the engine;

a retaining plate having holes therein fixed in the casing just below the outlet;

a fibrous filter disposed between the lower end of the casing and the retaining plate;

an evaporation chamber disposed above the fibrous filter and in free communication with the outlet of the casing;

a retaining bolt extending upwardly into the evaporation chamber from the retaining plate;

a splash baffle positioned within the evaporation chamber, and mounted on the retaining bolt in spaced relation with the retaining plate;

a tube extending upwardly from each hole for directing streams of filtered oil against the splash baffle;

spaced plates disposed between the retaining plate and the baffle, the spaced plates being configured with alternating concave and convex surfaces with the concave surfaces having drain holes adjacent the lowest point thereof for draining oil onto an adjacent convex surface, the concave surfaces extending beyond the convex surfaces whereby the lubricant drains off of the convex surfaces onto the adjacent lower concave surface, each of the plates having a center hole therethrough for receiving the retaining bolt and being spaced on the retaining bolt by bushings;

dams disposed on the upper surfaces of the convex and concave plates to slow the flow of oil thereacross and to spread the oil over the surfaces;

vent means positioned in the upper end of the casing above the baffle means for venting volatiles evaporated from the oil while the oil is in the evaporation chamber; and means for connecting the vent means to the air intake of the internal combustion engine to thereby apply a vacuum to the evaporation chamber to enhance evaporation of the volatiles from the oil.

* * * * *